May 2, 1967  A. E. WISE ETAL  3,317,307
METHOD OF GRANULATING FERTILIZER
Filed Jan. 20, 1964
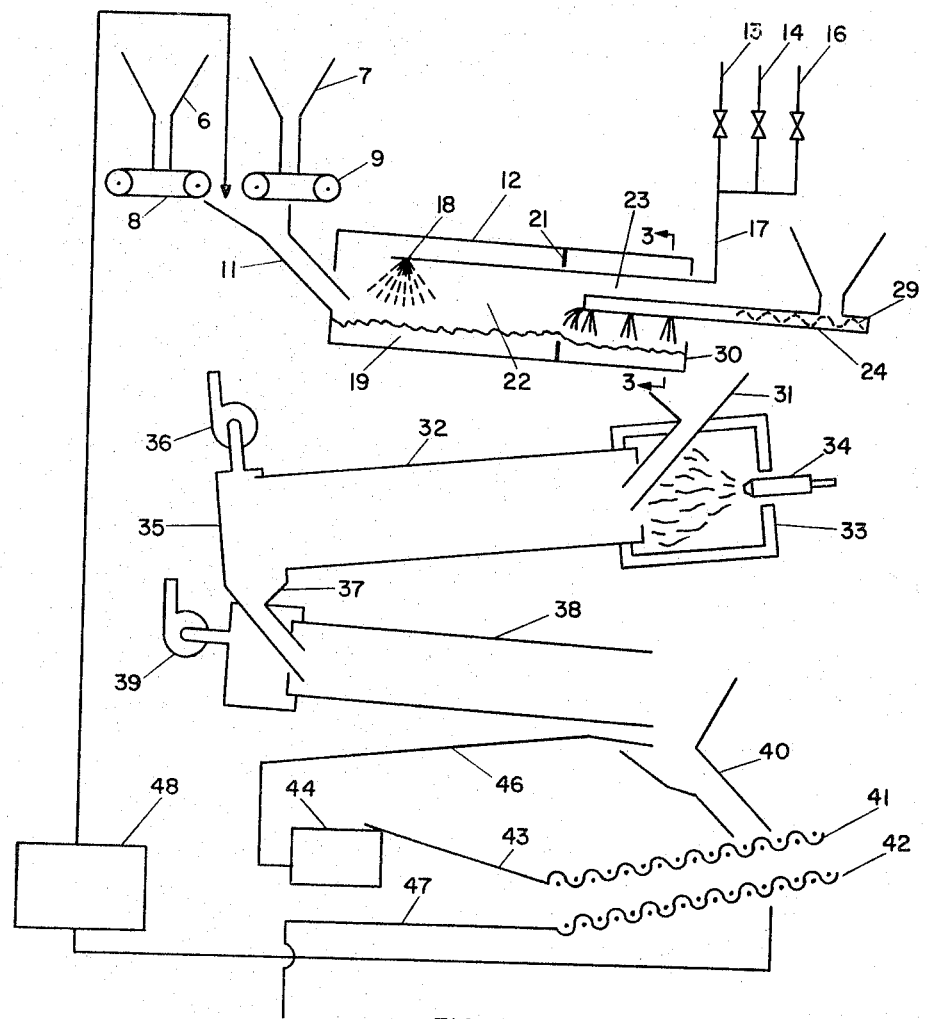
FIG. 1
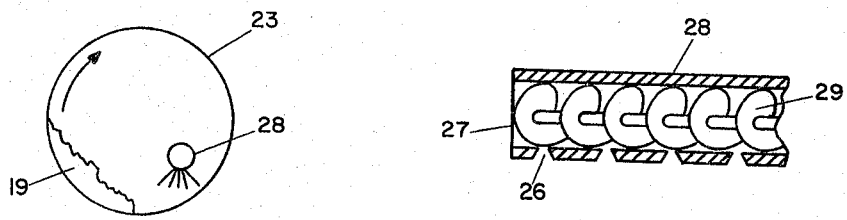
FIG. 3
FIG. 2
—INVENTORS
ANDREW E. WISE
JUDSON K. CHAPIN, JR.
THOMAS H. NICHOLS
BY Kenneth E Prince
ATTORNEY

United States Patent Office 3,317,307
Patented May 2, 1967

3,317,307
METHOD OF GRANULATING FERTILIZER
Andrew E. Wise and Judson K. Chapin, Jr., Greenville, S.C., and Thomas H. Nichols, Atlanta, Ga., assignors to W. R. Grace & Co., New York, N.Y., a corporation of Connecticut
Filed Jan. 20, 1964, Ser. No. 338,717
7 Claims. (Cl. 71—64)

This invention relates to the production of solid, particulate fertilizers. In one specific aspect, it relates to the production of fertilizers having decreased tendency to cake upon standing in humid atmospheres or under mechanical pressure. In another aspect, it relates to an improved method of manufacturing fertilizers.

The production of chemical fertilizers has always been attended by a tendency of the products to cake upon standing. Normally, fertilizer solids, when stored for extended periods, will form hard lumps which are difficult to break up. In piles, the lumps sometimes have to be blasted with dynamite. To reduce this tendency, the practice of granulating fertilizer has been adopted. This is usually done by moistening dry fertilizer solids and tumbling the moistened mass in a rotating drum to form the mass into discrete, globoid particles which, on drying, have a reduced tendency to cake.

Fertilizer solids to be granulated are treated initially in a vessel, such as a rotating drum, by adding water or liquid fertilizer ingredients in sufficient quantity to convert the solids into a plastic mass. This mass is tumbled for a time to insure complete mixing and is then passed into a granulator section. If desired, a pug mill may be substituted for the tumbling apparatus.

The formation of the plastic mass into the desired globoid particles or granules is normally carried out in a rotating drum of sufficient size that the bed of solids lies largely on the advancing side of the drum and the solids are rolled down the inner face of the bed with the rotation of the drum. This breaks up the plastic material into small particles and simultaneously forms them into balls or generally spherical particles. These particles, which initially are somewhat plastic, must be dried. This may be carried out in a separate dryer similar to the granulating drum heated by a flame injected axially into one end of the dryer so that the tumbling pellets become hardened. When the pellets are in a plastic state when they are introduced into the dryer, some agglomeration occurs. This increases the amount of fines and oversize material which must be removed in subsequent screening. The fines are normally returned to the granulator for mixing with fresh solids and solution. The oversize is ground and returned to the screen.

Mixing and granulating may be carried out in separate pieces of apparatus or they may be carried out in a single drum of sufficient size. If it is carried out in the same drum, a retaining ring is installed about 24–36 inches from the outlet to form two distinct zones, so that mixing and granulating are carried out in separate zones. Where the mixing is carried out in a pug mill, granulation is carried out in a separate tumbling drum or, sometimes, in the first portion of the dryer. In the latter case, it is necessary to prevent intimate contact of the flame with the freshly introduced pellets to avoid too rapid drying and resulting disintegration. Sometimes, this can be done by eliminating the flights in the inlet portion of the dryer. This gives the pellets time to become dried from radiant heat of the flame before direct contact with the hot drying gases. Normally, after the pellets have become hardened so that the danger of agglomeration is less, they may be brought into closer contact with the hot gases. For this purpose, the dryer may be equipped with flights in a major portion of its length away from the flame so the particles are raised and allowed to fall in a curtain through the dryer. In this way, better contact is provided and drying is more easily effected.

In a typical granulation process, fertilizer solids, such as superphosphate, potash and organic materials are fed at a controlled rate into a rotating drum which is divided into a mixing zone and a granulating zone by an inner retaining ring. Water and/or nitrogen solutions, or ammonia and sulphuric acid, as desired, are fed with the solids into the drum. Volatile liquids are usually introduced underneath the tumbling bed by means of spargers. Liquid is added in amount sufficient to form the solids into a plastic mass. Since some of the fertilizer ingredients are soluble, the liquid will dissolve a portion of the fertilizer. This is not detrimental since the solids are crystallized again into the fertilizer mass during drying.

The granulating zone of the rotating drum, downstream of the inner retaining ring, is usually shorter than the mixing section. At the outlet end, the mixer-granulator is provided with a second retaining ring so that a bed of fertilizer material is maintained in the granulator section at all times. As the drum rotates, the solids are carried up the wall and are allowed to tumble back down on the inner surface of the bed. This section of the apparatus is not provided with flights.

The amount of water soluble material in high-analysis fertilizer is considerably higher than in low-analysis fertilizers. With the increase of soluble materials, there is an increase in the tendency of the fertilizer to agglomerate during granulation and to cake on standing. Some of the agglomerates will break up in the drier but a major portion must be ground to product size.

With the increase in the amount of soluble components, there is a decided increase in the tendency of the fertilizer to stick to the drum in the granulator section. In one plant making typical formulations, it has been observed that the granulator will run for about 18–21 hours on a stretch. During this time, there builds up in the granulator section a cake of fertilizer about 1½ inches thick. It is then necessary to shut down the operation and to remove the cake of fertilizer solids by manual means. In this particular operation, the cake-removal requires about 3–4 hours. This means that in a 24-hour period the granulator may operate for about 20 hours and be down for about 4 hours for cleaning. This represents a loss of some 16 percent in production time. Mechanical knockers on the outside will not prevent this build-up.

We have discovered that it is possible to prevent the agglomeration of granules, to eliminate substantially the build-up of solids on the granulator walls, and to improve the storage characteristics of the finished product by introducing into the granulator a small amount of a finely divided lamellar material such as vermiculite, biotite, talc, chlorite or mica. The present discussion will be limited to vermiculite, but it is to be understood that the equivalent materials may be used. In accordance with our invention, vermiculite is introduced in a steady stream into the granulator to coat the granulator wall ahead of the tumbling mass of solids so that each time the mass tumbles onto the granulator wall, it contacts a thin layer of finely divided vermiculite. As a result, the build-up of solids on the granulator wall is substantially eliminated.

The plastic fertilizer granules, as they roll down the face of the mass, come into contact with the finely divided vermiculite and become coated. We have found that the particles which have been coated with vermiculite are much harder and show less tendency to agglomerate during subsequent drying than particles which have not been so coated. Also, there is a decided reduction in the caking that occurs during storage of the dried granulated product.

The present invention is further illustrated by reference to the accompanying drawings in which:

FIG. 1 is a schematic flow diagram of a granulating and drying unit for preparing granular fertilizer; and FIG. 2 is a longitudinal section of the discharge end of the vermiculite conveyor; and FIG. 3 is a cross-section of the granulator unit taken along line 3–3.

In accordance with the present invention, dry fertilizer solids are introduced from convenient storage hoppers 6 and 7 onto weigh feeders 8 and 9 into a chute 11 which discharges into mixer-granulator 12, here shown as a single rotatable drum driven by means not shown. The liquid ingredients are introduced through feed lines 13, 14 and 16 into a common line 17 and are discharged through appropriate spray means 18 onto the bed of tumbling solids 19 in the mixing portion 22 of mixer-granulator 12. An inner retaining ring 21 is appropriately placed intermediate the ends of mixer 12 to divide this unit into mixing zone 22 and granulating zone 23 and to maintain the bed of fertilizer solids 19 at the desired depth. Residence time in the mixing zone 22 is controlled to insure complete mixing of the fertilizer liquids with the solids. The quantity of liquid is controlled by the water content to give a plastic mass of fertilizer solids.

The plastic mass of solids spills over retaining ring 21 into granulator section 23 where, by continued tumbling, the mass is broken into small particles and formed into generally spherically but discrete particles of complete fertilizer.

The conditioning agent of the present invention is introduced into the granulator section 23 by means of a conveyor 24 which extends into the discharge end granulator 23 and terminates just short of the inner retaining ring 21. Spaced along the underside of the conveyor 24 within granulator 23 are a number of discharge ports 26 (FIG. 2) through which the conditioning agent is discharged into the granulator.

The conveyor is open at its inner end 27 so that material not discharged through the bottom ports 26 is discharged through the open end. Discharge ports 26 are flared from the inside to the outside of conveyor tube 28 (FIG. 2). This, with the motion of the screw 29 delivers a fluttering shower of the solid material onto the fertilizer solids and deck of the granulator below. As shown in FIG. 3, the position of conveyor tube 28 is off-center within granulator 23 so that the conditioning agent is showered onto the deck of the granulator 23 ahead of the tumbling solids 19. This provides a continuous coating of the conditioning agent on the surface of the granulator immediately before contact with the fertilizer solids. This substantially eliminates caking of the solids on the surface of granulator 23.

The bed within granulator 23 is maintained at a predetermined depth by means of an outer retaining ring 30. The conditioned particles from granulator 23 spill over retaining ring 30 into chute 31 which feeds the somewhat plastic but discrete globoid particles into a dryer 32. Adjacent the inlet end of dryer 32 is a combustion chamber 33 with a burner 34. Around the discharge end of dryer 32 is a breeching 35, and mounted thereon is an exhaust fan 36 which draws the combustion gases from burner 34 through dryer 32, which is here shown as a rotating drum. This is a conventional means of drying fertilizer solids wherein the material to be dried is lifted by flights, not shown, and is to rain down in a curtain in contact with the hot combustion gases.

The dried solids are discharged from breeching 35 through a chute 37 or other equivalent structure, into a cooler 38 which is open at the discharge end and which is provided with an exhaust fan 39 to draw cool air through the unit in contact with the hot dried fertilizer solids. The cool material discharges into a convenient chute 40, which feeds it onto a screen 41 for classification.

Oversize material spills off the lower end of screen 41 and is passed by appropriate conveyor 43 to a mill 44, where it is disintegrated and returned by conveyor 46 to chute 39 for re-screening. Product from screen 42 passes through an appropriate conveyor 47 to storage or other handling. Fines passing through both screens 41 and 42 are transported by a convenient conveyor device 48, such as pneumatic conveyor, back to a feed hopper 11 for introduction into a mixer 12.

This vermiculite used herein has a settled bulk density of about 65 lbs./cu. ft. and particle size described elsewhere.

It is important that the rate of addition be maintained constant. For this reason, we have found it desirable to provide a positive feed device, such as a screw conveyor 29, previously described. The amount of vermiculite used is of the order of 5–50 pounds per ton of finished product. Normally, the desired results can be obtained with about 15–30 pounds per ton, depending on the amount of soluble constituents contained in the fertilizer. A particle size of less than 40 is satisfactory, with the major portion of the material being less than 60 mesh size.

In referring to vermiculite, we mean the unexpanded material, which is much more dense than the expanded vermiculite and displays less tendency to break up on mixing with the fertilizer solids. Vermiculite, being a lamellar material coats the granules so that they more easily slide over other granules and result in a freer flowing material.

A typical screen analysis of a material which we have found to be excellent for the present purposes is as follows:

| Tyler | Cumulative percent retained weight |
|---|---|
| 28 | 0–2 |
| 35 | 0–5 |
| 48 | 0–20 |
| 65 | 10–40 |
| 100 | 30–70 |

The present invention is further illustrated by the following examples.

*Example 1*

In making a 3–9–9 tobacco fertilizer, nitrogen solution was sprayed onto a mixed superphosphate and potash solids in a rotating drum mixer. This material was mixed to the usual plastic mass and then spilled over an inner dam into a granulator section. Comminuted vermiculite was fed at a rate of about 20 pounds per ton of fertilizer as previously described.

The vermiculite was added across the entire three feet of the granulator section through a screw feeder. The rate of application was controlled by a Jeffrey 1–BH feeder with a vibrating trough to the inlet of the screw feeder which in turn conveyed the material across the ports in the end of the screw, distributing the vermiculite uniformly across the granulating section of the mixer-granulator. The overall length of the conveyor tube was 7 feet, the diameter 3 inches, and the screw inside was approximately 2 inches in diameter. The screw has a thrust bearing on the drive end and no bearing on the discharge end.

Along the bottom of the conveyor tube within the granulator were a number of half-in-ports, spaced approximately 3 inches on center. The ports had been flared from the inside out to avoid build up due to wetting of the dry vermiculite by moisture, which condenses or falls onto the conveyor tube. The screw action across the flared port causes a flutter in the falling material over an area of approximately 2 inches in diameter, thus obtaining the uniform layer of vermiculite across the metal in the pelletizing section of the ammoniator. With a 3–9–9 formulation, the build-up on the wall of the pelletizing section was substantially eliminated. After 9 hours' operation, the cake was less than ⅛ inch. The vermiculite was discontinued and, within 2 hours, the cake built an additional 1½ inches. The initial ⅛ inch build-up formed quickly but it remained constant thereafter.

There were no knockers or vibrators or scrapers used in this pelletizer set-up.

This 3-9-9 product had a higher percentage of particles in the desired size, i.e., passing a 6 mesh and retained on a 16 mesh screen. Without vermiculite 45% of the material was in this range. With vermiculite, we obtained 47.4% in the desired range and at the same time reduced the oversized material (plus 6 mesh) about 4.8% (from 18.8% to 14.0%). Reducing the oversize puts less wear on and avoids overloading the cage mill that is used in breaking up this oversize. The fines fraction passing the 16 mesh, which must be recycled, was increased by about 3% but it is easier to handle than is the oversize.

Fertilizer mixes having high urea contents are somewhat plastic and sticky even after drying and continued reaction in the pile is necessary for the solidifying of these particles for further tests.

The material prepared as described was bagged and stacked for set tests. The bottom bag was pulled every week and examined for caking. In each test, the treated material exhibited far less caking than the untreated material. Any lumps in the treated material were readily broken up by hand pressure while lumps in the untreated material could not be broken up even by repeated dropping of the bag on the hard floor. The foregoing formulation had not been successfully granulated before the addition of vermiculate as described.

*Example 2*

In other runs making 6-10-4 and 5-10-10 formulations, the material was found to agglomerate more readily with substantial absence of caking on the walls. Previous runs on the same formulations but without vermiculite had never been satisfactory and the products were characterized by extreme caking on standing.

*Example 3*

In another run in the equipment described under Example 1, a 6-10-4 formulation was prepared from similar starting material but the vermiculite was added at about 30 lbs./ton to the dry feed material. The material agglomerated better than previous runs without vermiculite but the amount of vermiculite was roughly twice the amount required when the vermiculite is fed to the granulator section directly.

*Example 4*

In another run for making a 12-12-12 formulation from normal superphosphate, muriate of potash and ammonia solution, the process was started without vermiculite addition. A thick cake quickly formed in the granulator section. Addition of vermiculite was then commenced at a rate of about 20 pounds per ton. The cake gradually broke away from the wall and the equipment ran clean as long as vermiculite was being added.

We claim:

1. The method of making a non-caking, granulated, free-flowing fertilizer characterized by a reduced tendency to cake under mechanical pressure comprising blending dry fertilizer solids with solutions to form a plastic mass, tumbling said mass in a confined rolling bed on a moving surface to form said mass into agglomerates of fertilizer solids, continuously coating said surface before each contact with said tumbling solids with a layer of comminuted lamellar mineral selected from the group consisting of vermiculite, talc, chlorite and mica to form at least a partial coating on said pellets and drying said coated pellets, thereby forming hard encrusted pellets having dispersed in the outer layer thereof said lamellar mineral in sufficient quantity to avoid sticking of said particles.

2. The method defined in claim 1 wherein the lamellar mineral is unexpanded vermiculite.

3. The method of claim 2 wherein the quantity of said lamellar mineral is between 5 and 50 lbs. per ton of finished solids.

4. The method of claim 2 wherein the lamellar mineral has a particle size such that a major portion will pass through a 40 mesh screen but will be retained on a 200 mesh screen.

5. The method of preparing hard, dry granular fertilizer particles having a reduced tendency to cake upon the application of mechanical pressure comprising mixing fertilizer solids and solutions to yield a plastic mass thereof, tumbling said mass against a moving surface which is continuously coated with finely divided vermiculite before each new contact of said mass with said surface to produce agglomerates, the quantity of said vermiculite being in the range of 5 to 50 pounds per ton of finished product, said vermiculite having a particle size predominately of −40 to +200 mesh subjecting said agglomerates to a drying step in which they are continuously agitated and simultaneously subjected to hot gases to reduce the moisture content thereof to about 0.5-10 percent, and cooling the dried particles.

6. In the process for granulating fertilizer wherein dry ingredients are mixed with liquid ingredients to form a plastic mass which is tumbled on a rolling surface to form discrete particles which are subsequently dried and classified, the improvement comprising continuously coating said surface just before each contact with said tumbling mass with comminuted vermiculite having a particle size predominately of −40 to +200 mesh said vermiculite being added in an amount between 5 and 50 lbs. per ton of finished product whereby said particles are at least partially coated with vermiculite, sticking to said surface is substantially avoided, and the tendency of said particles to agglomerate upon application of mechanical pressure is substantially less than that of uncoated particles.

7. The process of claim 6 wherein a portion up to 50% of the total vermiculite is added to the fertilizer solids before mixing with said liquid ingredients.

References Cited by the Examiner

UNITED STATES PATENTS

| | | | |
|---|---|---|---|
| 2,909,869 | 10/1959 | Dresser | 71—64 |
| 2,991,170 | 7/1961 | Szepesi | 71—64 |
| 3,006,753 | 10/1961 | Harvey | 71—64 |
| 3,027,249 | 3/1962 | Jost | 71—64 |
| 3,113,015 | 12/1963 | Brandt et al. | 71—64 |
| 3,137,565 | 6/1964 | Hayes | 71—62 X |

FOREIGN PATENTS 389,508　　3/1933　　Great Britain.

OTHER REFERENCES

Sauchelli, Vincent, Chemistry & Technology of Fertilizers, Reinhold Pub. Corp., New York, N.Y. (1960), pp. 424–426.

DONALL H. SYLVESTER, *Primary Examiner.*

ANTHONY SCIAMANNA, *Examiner.*

T. D. KILEY, *Assistant Examiner.*